United States Patent
Chen et al.

(10) Patent No.: US 7,684,888 B2
(45) Date of Patent: Mar. 23, 2010

(54) EXTENDABLE MES FOR CROSS-AMHS TRANSPORTATION

(75) Inventors: Hsieh-Chi Chen, Miaoli County (TW); Chih-Yuan Yu, ChangHua County (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 11/745,521

(22) Filed: May 8, 2007

(65) Prior Publication Data

US 2008/0281456 A1    Nov. 13, 2008

(51) Int. Cl.
*G05B 19/18* (2006.01)
*G05B 11/01* (2006.01)
*G06F 19/00* (2006.01)
*G06F 7/00* (2006.01)

(52) U.S. Cl. .............. 700/112; 700/3; 700/9; 700/19; 700/96; 700/121; 700/228; 414/935

(58) Field of Classification Search .............. 700/2, 700/3, 9, 10, 19, 20, 96, 112, 113, 115, 116, 700/121, 213, 228–230; 414/935, 937, 939, 414/940
See application file for complete search history.

(56) References Cited

U.S. PATENT DOCUMENTS

| | | | |
|---|---|---|---|
| 6,079,927 A * | 6/2000 | Muka | 414/217 |
| 6,240,335 B1 | 5/2001 | Wehrung et al. | |
| 6,317,725 B1 | 11/2001 | Muraoka | |
| 6,345,208 B1 | 2/2002 | Yoshiyuki | |
| 6,345,259 B1 | 2/2002 | Sandoval | |
| 6,477,432 B1 | 11/2002 | Chen et al. | |
| 6,647,316 B2 | 11/2003 | Bahri et al. | |
| 6,662,076 B1 | 12/2003 | Conboy et al. | |
| 6,705,523 B1 | 3/2004 | Stamm et al. | |
| 6,976,033 B2 | 12/2005 | Yang et al. | |
| 7,123,975 B2 | 10/2006 | Chen | |
| 7,212,877 B2 * | 5/2007 | Daferner et al. | 700/100 |
| 7,356,378 B1 | 4/2008 | Huang et al. | |

(Continued)

OTHER PUBLICATIONS

Ming Wang et al., U.S. Appl. No. 11/458,554, filed Jul. 19, 2006, Entitled: Integrated Transportation Control System for Wafer Fabrication Facility.

(Continued)

*Primary Examiner*—Sean P Shechtman
(74) *Attorney, Agent, or Firm*—Haynes and Boone, LLP

(57) ABSTRACT

In one aspect a factory automation system for a wafer fab is provided. The factory automation system is adapted to facilitate cross-AMHS transfers of wafer lots within a semiconductor foundry. The factory automation system may include a first MCS and an associated first AMHS; a second MCS and an associated second AMHS; and a third MCS and an associated third AMHS. The system may also include a first bridge connecting the first AMHS and the second AMHS to allow a FOUP to travel between the first AMHS and the second AMHS. The system may also include a second bridge connecting the second AMHS and the third AMHS to allow a FOUP to travel between the second AMHS and the third AMHS. The system also includes a unified control unit in communication with the first, second, and third MCSs, the unified control unit for coordinating transfers of FOUPs between the first, second, and third AMHSs.

10 Claims, 11 Drawing Sheets

U.S. PATENT DOCUMENTS

| | | |
|---|---|---|
| 7,426,421 B2 | 9/2008 | Chen |
| 2001/0023377 A1 | 9/2001 | Wehrung et al. |
| 2003/0083947 A1 | 5/2003 | Hoffman et al. |
| 2003/0108407 A1* | 6/2003 | Ogata et al. ............. 414/270 |
| 2003/0200130 A1 | 10/2003 | Kall et al. |
| 2004/0158339 A1 | 8/2004 | Kawase et al. |
| 2005/0096775 A1* | 5/2005 | Wang et al. ............. 700/112 |
| 2005/0125089 A1* | 6/2005 | Puri et al. ............. 700/96 |
| 2006/0190118 A1* | 8/2006 | Teferra et al. ............. 700/112 |

OTHER PUBLICATIONS

Chinese Patent Office, Chinese Office Action, Jul. 10, 2009, 4 Pages, Application No. 2008100913832.

* cited by examiner

US 7,684,888 B2

EXTENDABLE MES FOR CROSS-AMHS TRANSPORTATION

BACKGROUND

The manufacture of semiconductor devices involves the performance of a series of process steps using a variety of high tech production and metrology tools in a certain order and often within a certain period of time. The primary function of a wafer logistics system in a wafer fabrication facility, or "fab," is to deliver the wafers to each of the tools at the right time, as well as to track the location and status of the wafers throughout the process. Automated material handling systems ("AMHS") are applied to wafer fabs to carry out the automated functions more efficiently, consistently, and safely than can be done via manual means. The fabrication process often results in the need for cross-floor and cross-phase transportation within a single fab and/or cross-fab transportation between fabs.

When a wafer carrier, such as a front opening unified pod ("FOUP"), containing wafers is to be transferred, a manufacturing execution system ("MES") determines to what destination in the fab the wafer carrier should be transferred. Once the destination decision has been made, the MES sends a transfer request to a material control system ("MCS"), which calculates a detailed transportation route using a route search engine and then notifies a transfer manager to execute the transfer step-by-step. However, typical MES and MCS systems are limited to a single fab and cannot process cross-fab and/or cross-AMHS transportation requests. The MES and MCS systems of one fab are often unable to communicate with the AMHS of a separate fab. In that regard, different fabs may have different AMHS vendors and communication protocols.

Although existing systems and methods have been generally adequate for their intended purposes, they have not been entirely satisfactory in all respects.

DETAILED DESCRIPTION

Figure 1:
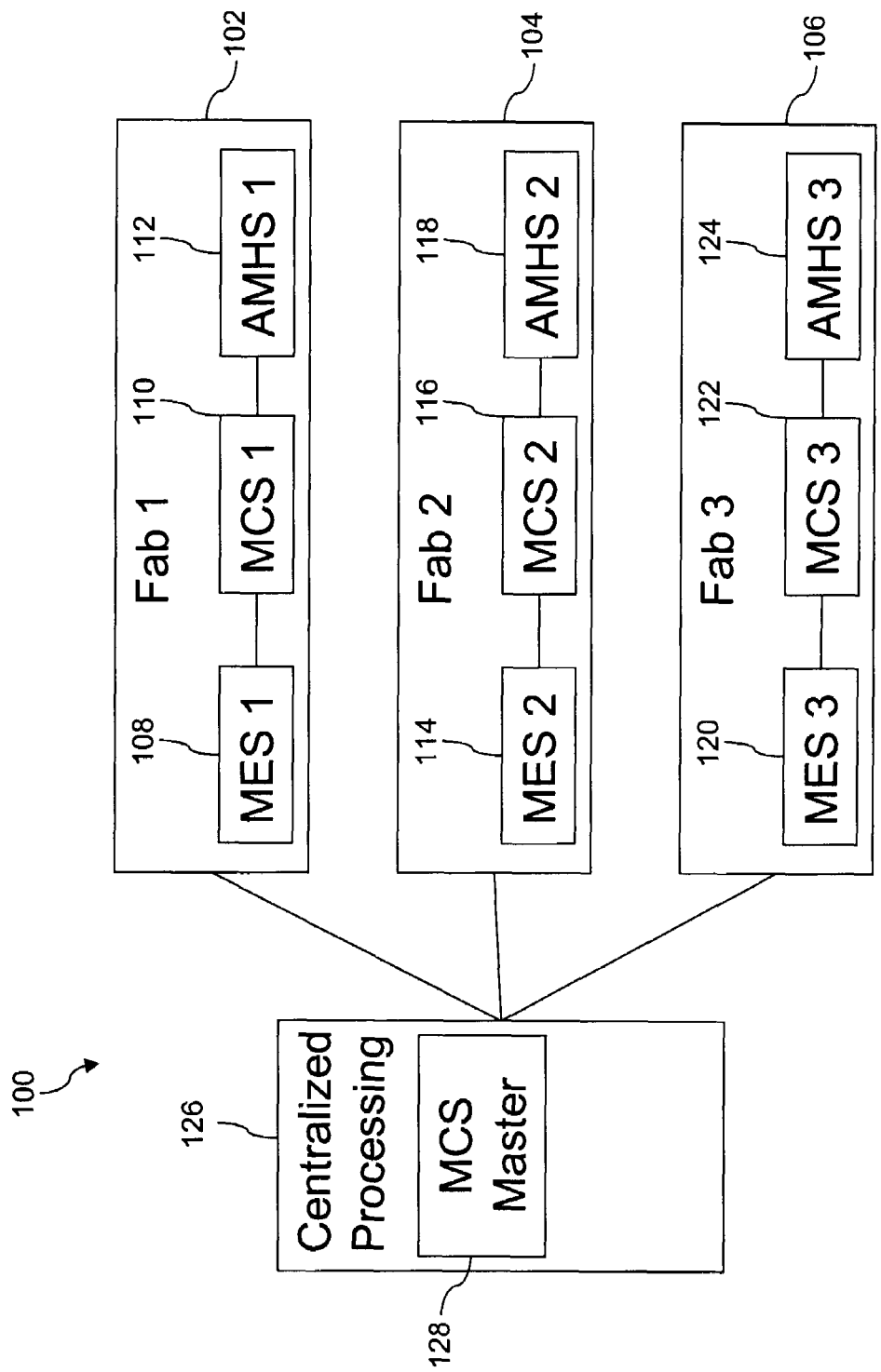
FIG. 1 is a schematic diagram illustrating a factory automation system for facilitating cross-fab wafer transportation according to one embodiment of the present disclosure.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

It is understood that the following disclosure provides many different embodiments, or examples, capable of implementing different features. Specific examples of components and arrangements are described below to simplify and thus clarify the present disclosure. These are, of course, merely examples and are not intended to be limiting. In many instances, the features of one embodiment may be combined with the features of other embodiments. In addition, the present disclosure may repeat reference numerals and/or letters in the various exemplary embodiments. This repetition is for the purpose of simplicity and clarity and does not in itself dictate a relationship between the various embodiments and/or configurations discussed.

A semiconductor foundry may include a plurality of fabs. During processing, a wafer may be transferred between the plurality of fabs for different steps of the manufacturing process. A "cross-fab transfer" involves the transfer of a wafer carrier, or FOUP, from one fab to another. A "cross-AMHS transfer" involves the transfer of a wafer carrier, or FOUP, from one AMHS to another AMHS, regardless of whether the AMHSs are separate systems within a single fab or systems in separate fabs. Each fab may include multiple phases and/or multiple floors. In that regard, in some embodiments the fab may be what is referred to as a "Gigafab." A "cross-floor transfer job" involves the transfer of a wafer carrier, or FOUP, from one floor to another. A "cross-phase transfer job" involves the transfer of a wafer carrier, or FOUP, from one phase to another.

Each phase of a fab includes a plurality of bays that may include processing tools or equipment. The equipment within each bay may be interconnected by an intrabay overhead transport ("OHT") system. The bays may be interconnected with the other bays via an interbay OHT system. As will be familiar to those of ordinary skill in the relevant art, the intrabay OHT systems and the interbay OHT system comprise overhead tracks on which OHT vehicles transport FOUPs containing lots of wafers to be processed to and from the equipment of the bays, often via stockers. In addition to or in lieu of the OHT systems, each fab may include an intrabay and/or interbay overhead shuttle ("OHS") system. Each fab may also include a cross-floor transportation system. The cross-floor transportation system may include lifters and/or other mechanisms for implementing cross-floor transfers of FOUPs.

Referring now to FIG. 1, shown therein is a simplified diagram of a factory automation system 100 for facilitating cross-fab wafer transportation according to one embodiment of the present disclosure. The system 100 includes a fab 102, a fab 104, and a fab 106. The fab 102 includes an MES 108, an MCS 110, and an AMHS 112. The fab 104 includes an MES 114, an MCS 116, and an AMHS 118. The fab 106 includes an MES 120, an MCS 122, and an AMHS 122. It is understood that the MESs 108, 114, and 120; the MCSs 110, 116, and 122; and the AMHSs 112, 118, and 124 may include a plurality of components as is known in the art. For example but without limitation, each AMHS 112, 118, and 124 may includes a plurality of control modules, such as a reticle stocker controller, a stocker controller, an overhead buffer controller, an inter-bay OHS controller, an intra-bay OHT controller, and/or a lifter controller. The AMHSs 112, 118, and 124 may include additional, fewer, and different control modules in some embodiments.

The system 100 also includes a unified control unit 126. The unified control unit 126 is configured to facilitate and/or organize transportation of wafers among and between the fabs 102, 104, and 106. The unified control unit 126 is configured to communicate with each of the fabs 102, 104, and 106. In that regard, the unified control unit 126 may act as a server for receiving and providing information and/or instructions to each of the fabs. The unified control unit may also act as a communications link between fabs such that the MES, MCS, and/or other systems of each fab may communicate directly with the systems of another fab. The unified control unit 126 may comprise hardware, software, or combinations of hardware and software. In some embodiments, the unified control unit 126 is a stand alone unit separate from the MES, MCS, and other systems of each fab. In other embodiments, the unified control unit 126 is a component or part of at least one of the fabs. In at least some embodiments, communication between the unified control unit 126 and the fabs 102, 104, and 106 is by Common Object Request Broker Architecture ("CORBA"). Further, communication between components of the unified control unit 126 and communication between components of the fabs 102, 104, and 106 may utilized CORBA. However, in other embodiments other communications protocols and/or middleware may be used.

In the current embodiment, the unified control unit 126 includes an MCS master 128. The MCS master 128 is configured to manage and communicate with the MCSs 110, 116, and 122 of the fabs 102, 104, and 106, respectively. In particular, the MCS master 128 is configured to communicate with each of the MCSs 110, 116, and 122 such that a cross-AMHS transfer can synchronized across the different AMHSs 112, 118, and 124 by sending appropriate transfer request signals to the MCSs. To that end, the MCS master 128 may be in communication with a database or a plurality of databases containing information regarding the MES and AMHS mapping for each fab, the available transfer patterns for each fab, the bridge settings and available transfer patterns between fabs; and/or other information related to transferring wafers within each fab and between the plurality of fabs.

The unified control unit 126 is configured to synchronize the MCSs 110, 116, and 122 and/or the AMHSs 112, 118, and 124 of the different fabs 102, 104, and 106 to facilitate movement of a wafer lot among the different fabs. In that regard, the AMHSs 112, 118, and 124 may be from the same vendor or from different vendors. Where the unified control unit 126 is configured to facilitate movement of a wafer lot between AMHSs from different vendors, the unified control unit is capable of heterogeneous AMHS integration. Heterogeneous AMHS integration can be advantageous as it allows cross-AMHS transportation among AMHSs from different vendors in addition to cross-AMHS transportation between AMHSs from the same vendor. For example, heterogeneous AMHS integration can allow each fab of a semiconductor foundry the flexibility to choose an AMHS vendor or other transport system from different vendors and not be tied to a single vendor. Also, automated cross-AMHS transportation in general provides a savings of man power and can provide alternative production routes when a fab or AMHS is down or non-operational for some reason. Thus, manufacturing may continue even where a fab or AMHS is not properly functioning. The unified control unit 126 can extend AMHS scalability beyond a single fab to the entire manufacturing process, including Gigafab applications. Also, the unified control unit 126 can be used to define and maintain MES and AMHS relationships across multiple fabs and/or AMHSs.

Figure 2:
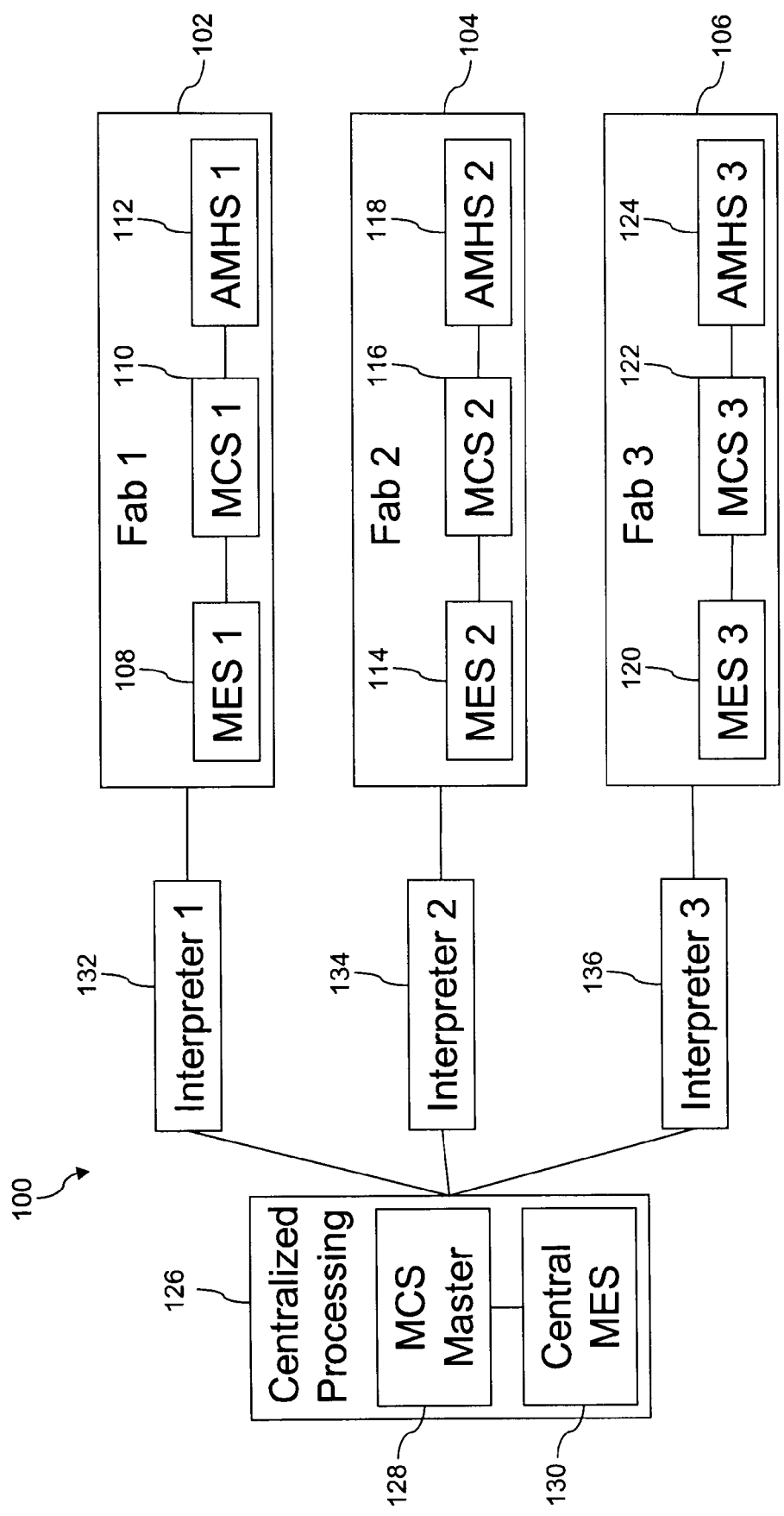
FIG. 2 is a schematic diagram of a factory automation system for facilitating cross-fab wafer transportation according to another embodiment of the present disclosure.

Referring now to FIG. 2, shown therein is a simplified diagram of a factory automation system 101 for facilitating cross-fab wafer transportation according to another embodiment of the present disclosure. In several aspects, the system 101 is substantially similar to the system 100 described above. The system 101 includes a fab 102, a fab 104, and a fab 106. The fab 102 includes an MES 108, an MCS 110, and an AMHS 112. The fab 104 includes an MES 114, an MCS 116, and an AMHS 118. The fab 106 includes an MES 120, an MCS 122, and an AMHS 122. The system 101 also includes a unified control unit 126. The unified control unit 126 is configured to facilitate and/or organize transportation of wafers among and between the fabs 102, 104, and 106. In the current embodiment, the unified control unit 126 includes an MCS master 128 and a central MES 130. The MCS master 128 is configured to manage the MCSs 110, 116, and 122 of the fabs 102, 104, and 106, respectively. The central MES 130 is in communication with the MCS master 128 and the MESs 108, 114, and 120 of each of the fabs 102, 104, and 106. The central MES 130 is configured to define and maintain MES and AMHS relations between and among the fabs 102, 104, and 106. Thus, in some embodiments the central MES 130 provides MES and AMHS architecture across the fabs 102, 104, and 106 for use in selecting appropriate transfer routes for wafer lots within the fabs.

The system 101 also includes an interpreter 132 between the unified control unit 126 and the fab 102, an interpreter 134 between the unified control unit 126 and the fab 104, and an interpreter 136 between the unified control unit 126 and the fab 106. Since the MCSs 110, 116, and 122 and the AMHSs 112, 118, and 124 of each the fabs 102, 104, and 106 may be from a different manufacturer or vendor, the system 101 is configured to communicate with the various protocols for each vendor. Thus, in the current embodiment the system includes the interpreters 132, 134, and 136. The terms interpreter and translator may be used interchangeably herein to refer to an application that converts a first protocol or communication language into a second protocol or communication language. The interpreters 132, 134, and 136 translate the signals generated from the unified control unit 126 into the appropriate communication language for the MES, MCS, and/or AMHS that will receive the signal. In that regard, a single interpreter may be used across multiple MESs, MCSs, and/or AMHSs where the systems will use the same communication language. Thus, it is contemplated that the system 101 may have an interpreter for each protocol or communications language that is shared among all of the systems that utilize that protocol. It is understood that the interpreters 132, 134, and 136 may be software applications, hardware, and/or combinations of software and hardware. Further, the interpreters 132, 134, and 136 may be a component of the unified control unit 126, a component of a fab, a stand-alone unit, and/or combinations thereof.

Figure 3:
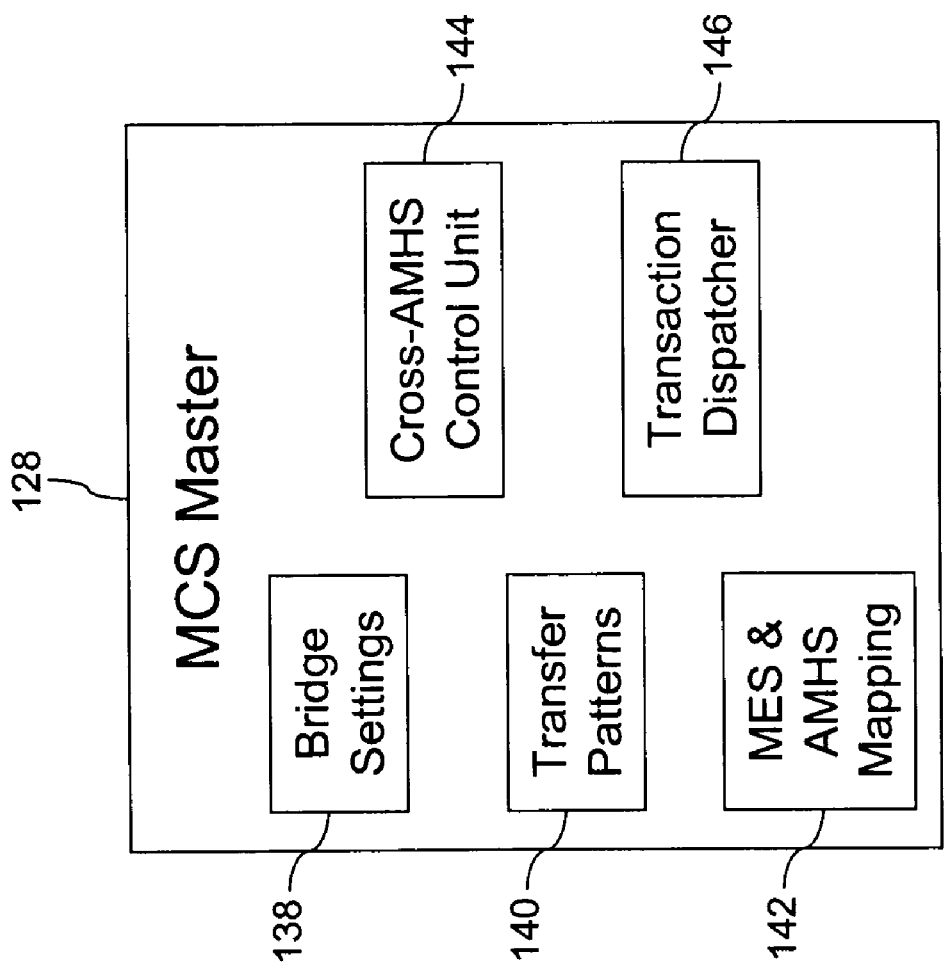
FIG. 3 is a schematic diagram of an MCS Master according to one embodiment of the present disclosure for use with the systems of FIGS. 1 and 2.

Referring now to FIG. 3, shown therein is a schematic diagram of an MCS Master 128 according to one embodiment of the present disclosure for use with the systems 100 and 101 described above. As illustrated, the MCS Master 128 includes bridge settings 138, transfer patterns 140, MES and AMHS mapping 142, a cross-AMHS control unit 144, and a transaction dispatcher 146. In that regard, includes as used in the previous sentence is intended to include having access to. For example, it is fully contemplated that one or more of the bridge settings 138, transfer patterns 140, and MES and AMHS mapping 142 may be stored in a database accessible by the MCS Master 128. Thus, the MCS Master 128 may be in communication with such a database rather than storing or maintaining the bridge settings 138, transfer patterns 140, and MES and AMHS mapping 142 itself. On the other hand, in some embodiments the MCS Master 128 may store and/or maintain the bridge settings 138, transfer patterns 140, and/or MES and AMHS mapping 142 itself.

The bridge settings 138 represent the connections between AMHSs and/or fabs. In some embodiments, the unified control unit 126 may define a bridge between the AMHSs and/or fabs. In that regard, the bridge may be a piece or hardware and/or a series of hardware components such as a stocker, conveyor, overhead system, and/or combinations thereof. On the other hand, the bridge may simply be a defined location within an OHT or OHS. Where the bridge is a defined point within an existing system, it may be referred to as a virtual point. The bridge serves as the connection between the AMHSs such that at the bridge control of a FOUP or wafer lot may be passed from one AMHS to another. Thus, in some embodiments the bridge is an area where two or more AMHSs may operate together. In this manner, the FOUP may be transferred across multiple AMHSs by passing control of the FOUP from one AMHS to another at each bridge location. A bridge connecting one AMHS to another AMHS may accommodate one-way traffic and/or two-way traffic. That is, the bridge may facilitate transferring a FOUP from the first AMHS to the second AMHS, from the second AMHS to the first AMHS, or both. Where the bridge is configured for one-way transfers, an additional bridge may connect the two AMHSs such that FOUPs can be transferred both ways between the AMHSs. In some embodiments, a bridge may connect more than two AMHSs to one another.

The transfer patterns 140 represent the available routes for transferring a FOUP between a first position in a first AMHS and a second position in a second AMHS. In some embodiments, the transfer patterns are dynamic and may be updated by such factors as static and dynamic traffic conditions, lot information, lot priority, available routes, route distances, maintenance schedules, and/or other factors. The MES and AMHS mapping 142 provide static information regarding the available routing within the individual fabs and AMHSs that is combined to form a global mapping across the multiple MESs and AMHSs. In that regard, the MES and AMHS mapping 142 may include the location of various tools and equipment among the fabs and AMHSs that can be utilized in route planning and assessment. While in some of the embodiments described below there appears to be a single route between positions, this is simply for the sake of clarity and example and should not be considered limiting. Rather, it is fully contemplated that there be multiple routes for transferring a FOUP between AMHSs from the first position to the second position. In that regard, the systems 100, 101 may include apparatus and methods for route selection as described in U.S. patent application Ser. No. 11/695,988, filed Apr. 3, 2007, hereby incorporated by reference in its entirety, that may be adapted for cross-AMHS transportation. Further, the systems 100, 101 may also include an integrated transportation control system as described in U.S. patent application Ser. No. 11/458,554, filed Jul. 19, 2006, hereby incorporated by reference in its entirety.

The cross-AMHS control unit 144 and the transaction dispatcher 146 are configured to provide the transfer request signals to each of the MCSs. In that regard, transfer of a FOUP between AMHSs may be broken down into sub-routes comprised of transfers within a single AMHS. In some embodiments, the transfer may be broken down into sub-routes comprised of transfers within a single AMHS and transfers across a bridge. Multiple sub-routes may be linked together to create the full transfer route. In some embodiments, the transfer patterns 140 are based on available combinations of sub-routes for achieving the desired transfer. Thus, the cross-AMHS control unit 144 and the transaction dispatcher 146 may be configured to synchronize the multiple AMHSs to facilitate the transfer of the wafer. In some embodiments, the cross-AMHS control unit 144 is configured to provide a cross-AMHS transfer request indicative of a selected transfer route. The transaction dispatcher 146 may be configured to then communicate the corresponding sub-route transfer requests associated with the cross-AMHS transfer requests to the individual AMHSs for execution. By coordinating the sub-route transfer requests the entire cross-AMHS transfer request can be properly executed. In some embodiments, the transaction dispatcher 146 sends the transfer request through an interpreter appropriate for the individual AMHS. In other embodiments, the transaction dispatcher 146 may function as an interpreter itself.

While the systems 100, 101 have been described as having a particular combination of components, it is understood that the systems 100, 101 may have fewer or greater components as would be apparent to one skilled in the art. In addition, the functions of some of the various components may be combined into a single component and/or functions of a single component may be split out into multiple components. In other embodiments, the systems 100, 101 may include additional fabs and/or AMHSs in communication with the unified control unit 126. Cross-fab and/or cross-AMHS transportation can be extended to the additional fabs and/or AMHSs in a manner similar to that described above with respect to fabs 102, 104, and 106. Further, in some embodiments the systems 100, 101 may be configured for use with only two fabs or AMHSs.

Figure 4:
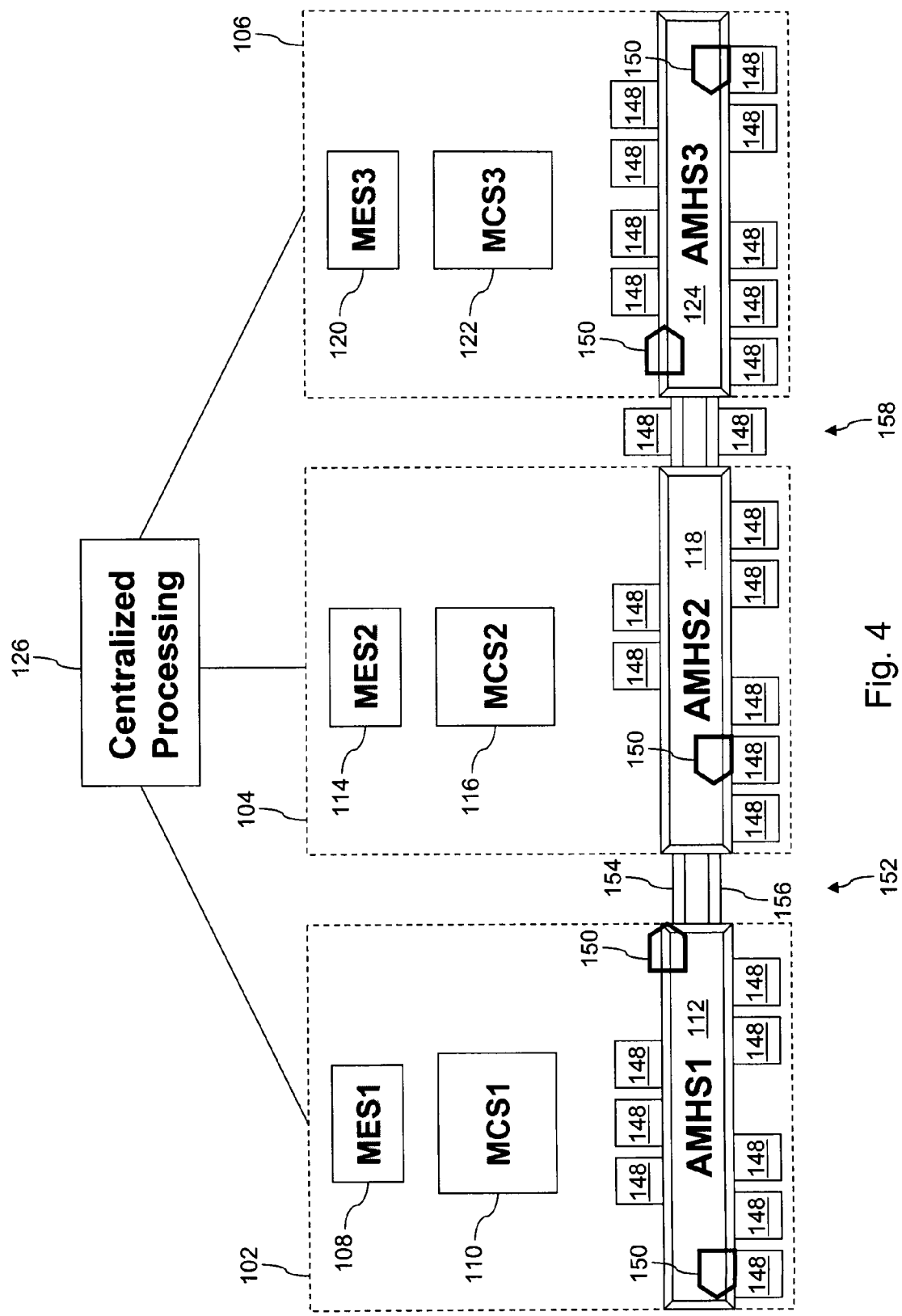
FIG. 4 is a schematic diagram illustrating at least a portion of a manufacturing facility including a factory automation system and a plurality of fabs according to one embodiment of the present disclosure.

Referring now to FIG. 4, shown therein is a schematic diagram illustrating at least a portion of a manufacturing facility including a factory automation system and a plurality of fabs according to one embodiment of the present disclosure. In particular, FIG. 4 provides a schematic illustration of aspects of the systems 100, 101 described above in use with fabs 102, 104, and 106. In that regard, the same reference numerals have been utilized to refer to similar devices and systems, however no limitation is intended thereby.

As shown, FIG. 4 includes a fab 102, a fab 104, and a fab 106. The fab 102 includes an MES 108, an MCS 110, and an AMHS 112. The fab 104 includes an MES 114, an MCS 116, and an AMHS 118. The fab 106 includes an MES 120, an MCS 122, and an AMHS 124. A unified control unit 126 is in communication with the fabs 102, 104, and 106. As described above, the unified control unit 126 is configured to facilitate and/or organize transportation of wafers among and between the fabs 102, 104, and 106. In particular, the unified control unit 126 is configured to facilitate transportation of wafer lots between the equipment 148, including processing tools, stockers, and other equipment, of the various AMHSs 112, 118, and 124. In the current embodiment, the wafer lots are transferred via FOUPs 150 between the equipment 148.

A bridge 152 connects the fab 102 to the fab 104 and, in particular, the AMHS 112 to the AMHS 118. In that regard, the bridge includes a section 154 for transferring FOUPs from the fab 102 to the fab 104 and a section 156 for transferring FOUPs from the fab 104 to the fab 102. Similarly, a bridge 158 connects the fab 104 to the fab 106 and, in particular, the AMHS 118 to the AMHS 124. The bridge 158 may be substantially similar to the bridge 152 in some aspects, including having a section for transferring FOUPS from the fab 104 to the fab 106 and a section for transferring FOUPs from the fab 106 to the fab 104. However, in the current embodiment the bridge 158 also includes equipment 148 as shown. In some embodiments, the equipment 148 is a stocker for temporarily holding a FOUP. In that regard, one of the AMHSs 118 or 124 may place a FOUP in the stocker such that the other AMHS can pick up the FOUP and continue the transfer process. In other embodiments, the equipment 148 is not a stocker, but other processing tool and/or storage device.

Figure 5:
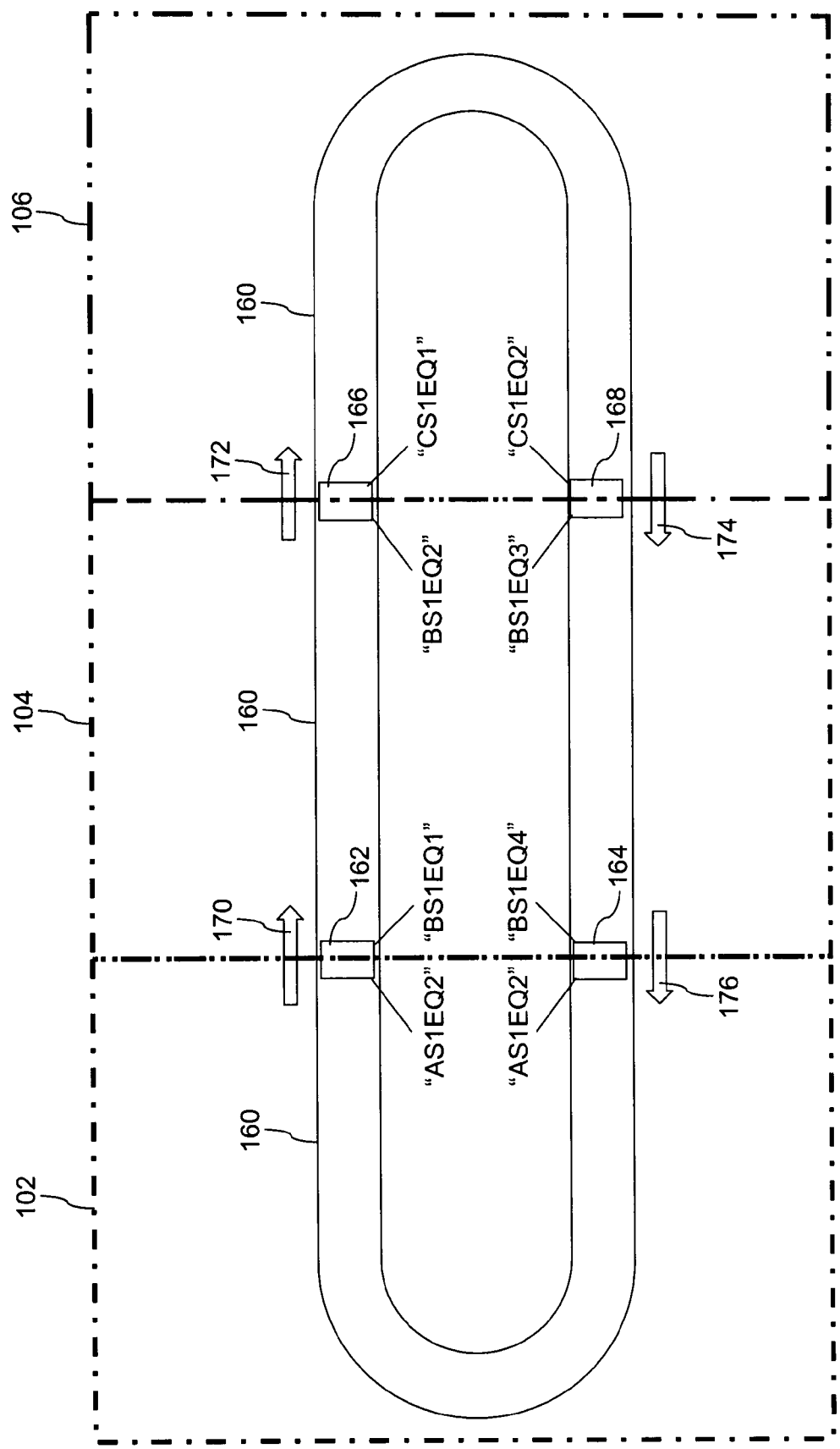
FIG. 5 is a schematic diagram illustrating a cross-fab transportation system according to one embodiment of the present disclosure.

Referring now to FIG. 5, shown therein is a schematic diagram illustrating a cross-fab transportation system according to one embodiment of the present disclosure. In particular, FIG. 5 shows a possible transportation system for cross-AMHS transfers between fabs 102, 104, and 106. As shown in FIG. 5, an overhead shuttle system 160 ("OHS") connects the fabs 102, 104, and 106 to one another. In that regard, the OHS 160 includes a bridge point 162 for transfers from fab 102 to fab 104, a bridge point 164 for transfers from fab 104 to fab 102, a bridge point 166 for transfers from fab 104 to fab 106, and a bridge point 168 for transfers from fab 106 to fab 104. The bridge points 162, 164, 166, and 168 may be designated points of the OHS 160 where control of a FOUP may be transferred from one AMHS to another. The bridge points 162, 164, 166, and 168 may be virtual points designated within the OHS 160. That is, the bridge points 162, 164, 166, and 168 do not require any additional structures, mechanisms, or equipment be added to or connected to the OHS 160 to function as the bridge between the fabs. In other embodiments, the bridge points 162, 164, 166, and/or 168 may include additional structures, mechanisms, or equipment that are connected to the OHS 160.

As shown, in the current embodiment the bridge points 162, 164, 166, and 168 are one-way. That is, each bridge point 162, 164, 166, and 168 facilitates transfers in only one direction between the fabs. Thus, a transfer between fab 102 and fab 104, represented by arrow 170, may be accomplished by an AMHS of fab 102 carrying a FOUP to bridge point 162 and then an AMHS of fab 104 picking up the FOUP from the bridge point 162. The bridge point 162 may be referred to as transfer point AS1EQ2 in terms of the AMHS of fab 102. The bridge point 162 may be referred to as transfer point BS1EQ1 in terms of the AMHS of fab 104. Similarly, a transfer between fab 104 and fab 106, represented by arrow 172, may be accomplished by an AMHS of fab 104 carrying a FOUP to bridge point 166 and then an AMHS of fab 106 picking up the FOUP from the bridge point 166. The bridge point 166 may be referred to as transfer point BS1EQ2 in terms of the AMHS of fab 104. The bridge point 166 may be referred to as transfer point CS1EQ1 in terms of the AMHS of fab 106.

Further, a transfer between fab 106 and fab 104, represented by arrow 174, may be accomplished by an AMHS of fab 106 carrying a FOUP to bridge point 168 and then an AMHS of fab 104 picking up the FOUP from the bridge point 168. The bridge point 168 may be referred to as transfer point CS1EQ2 in terms of the AMHS of fab 106. The bridge point 166 may be referred to as transfer point BS1EQ3 in terms of the AMHS of fab 104. Similarly, a transfer between fab 104 and fab 102, represented by arrow 176, may be accomplished by an AMHS of fab 104 carrying a FOUP to bridge point 164 and then an AMHS of fab 102 picking up the FOUP from the bridge point 164. The bridge point 164 may be referred to as transfer point BS1EQ4 in terms of the AMHS of fab 104. The bridge point 164 may be referred to as transfer point AS1EQ2 in terms of the AMHS of fab 102.

Figure 6:
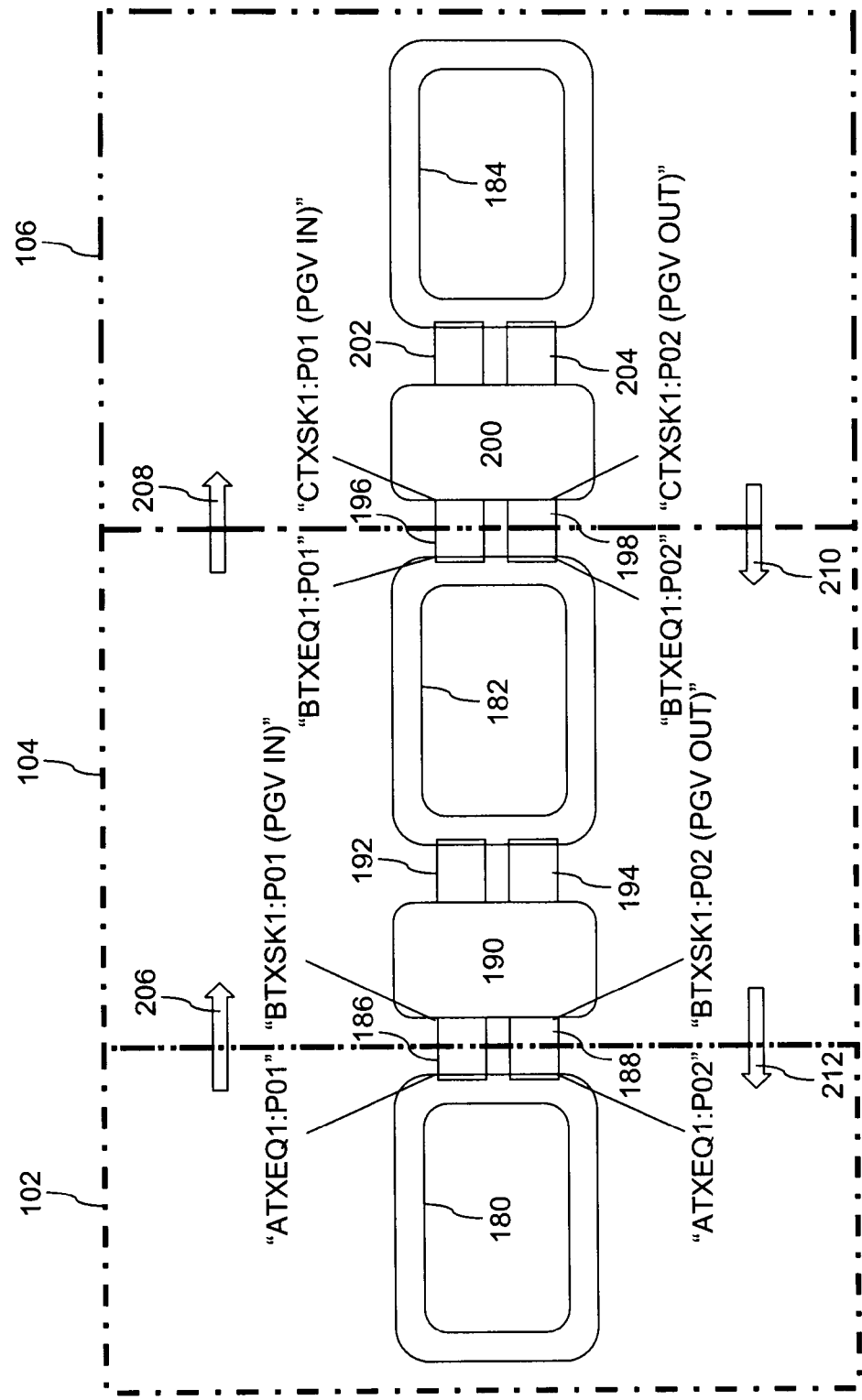
FIG. 6 is a schematic diagram illustrating a cross-fab transportation system according to another embodiment of the present disclosure.

Referring now to FIG. 6, shown therein is a schematic diagram illustrating a cross-fab transportation system according to another embodiment of the present disclosure. In particular, FIG. 6 shows a possible transportation system for cross-AMHS transfers between fabs 102, 104, and 106. As shown in FIG. 6, fab 102 includes an OHT 180, fab 104 includes an OHT 182, and fab 106 includes an OHT 184. A bridge point 186 and a bridge point 188 connect the OHT 180 of fab 102 to a stocker 190. In some embodiments, the stocker 190 may be a conveyor. In other embodiments, the stocker 190 may be replaced with other types of equipment. The stocker 190, in turn, is connected to the OHT 182 of fab 104 via unit nodes 192 and 194, as shown. In some embodiments, the bridge points 186 and 188, the stocker 190, and the unit nodes 192 and 194 collectively act as a bridge between the AMHSs of fab 102 and fab 104. In other embodiments, the stocker 190 and the unit nodes 192 and 194 are part of the fab 104. Similarly, a bridge point 196 and a bridge point 198 connect the OHT 182 of fab 104 to a stocker 200. The stocker 200, in turn, is connected to the OHT 184 of fab 106 via unit nodes 202 and 204, as shown. In some embodiments, the bridge points 196 and 198, the stocker 200, and the unit nodes 202 and 204 collectively act as a bridge between the AMHSs of fab 104 and fab 106. In other embodiments, the stocker 200 and the unit nodes 202 and 204 are part of the fab 106.

A transfer between fab 102 and fab 104, represented by arrow 206, may be accomplished by the AMHS of fab 102, such as OHT 180, carrying a FOUP to bridge point 186 where the FOUP is moved to stocker 190. The FOUP may be moved to stocker 190 from the bridge point 186 by the AMHS of fab 102, the AMHS of fab 104, a separate bridge transportation system (not shown), and/or combinations thereof. Then the FOUP is transferred from the stocker 190 to the AMHS of fab 104, such as OHT 182, via unit node 192. The bridge point 186 may be referred to as transfer point ATXEQ1:P01 in terms of the AMHS of fab 102. The bridge point 186 may be referred to as transfer point BTXSK1:P01 (PGV IN) in terms of the AMHS of fab 104. Similarly, a transfer between fab 104 and fab 106, represented by arrow 208, may be accomplished by the AMHS of fab 104, such as OHT 182, carrying a FOUP to bridge point 196 where the FOUP is moved to stocker 200. The FOUP may be moved to stocker 200 from the bridge point 196 by the AMHS of fab 104, the AMHS of fab 106, a separate bridge transportation system (not shown), and/or combinations thereof. The FOUP is transferred from the stocker 200 to the AMHS of fab 106, such as OHT 184, via unit node 202. The bridge point 196 may be referred to as transfer point BTXEQ1:P01 in terms of the AMHS of fab 104. The bridge point 196 may be referred to as transfer point CTXSK1:P01 (PGV IN) in terms of the AMHS of fab 106.

Further, a transfer between fab 106 and fab 104, represented by arrow 210, may begin with the AMHS of fab 106, such as OHT 184, carrying a FOUP to stocker 200 via the unit node 204. The FOUP may be accessible via bridge point 198 from the stocker 200. In some embodiments, the FOUP is moved from the stocker 200 to bridge point 198 by the AMHS of fab 106, the AMHS of fab 104, a separate bridge transportation system (not shown), and/or combinations thereof. The FOUP is transferred from the stocker 200 and/or the bridge point 198 by the AMHS of fab 104, such as OHT 182. The bridge point 198 may be referred to as transfer point CTXSK1:P02 (PGV OUT) in terms of the AMHS of fab 106. The bridge point 198 may be referred to as transfer point BTXEQ1:P02 in terms of the AMHS of fab 104. A transfer between fab 104 and fab 102, represented by arrow 212, may begin with the AMHS of fab 104, such as OHT 182, carrying a FOUP to stocker 190 via the unit node 194. The FOUP may be accessible via bridge point 188 from the stocker 190. In some embodiments, the FOUP is moved from the stocker 190 to bridge point 188 by the AMHS of fab 104, the AMHS of fab 102, a separate bridge transportation system (not shown), and/or combinations thereof. The FOUP is transferred from the stocker 190 and/or the bridge point 188 by the AMHS of fab 102, such as OHT 180. The bridge point 188 may be referred to as transfer point BTXSK1:P02 (PGV OUT) in terms of the AMHS of fab 104. The bridge point 198 may be referred to as transfer point ATXEQ1:P02 in terms of the AMHS of fab 102.

Figure 7:
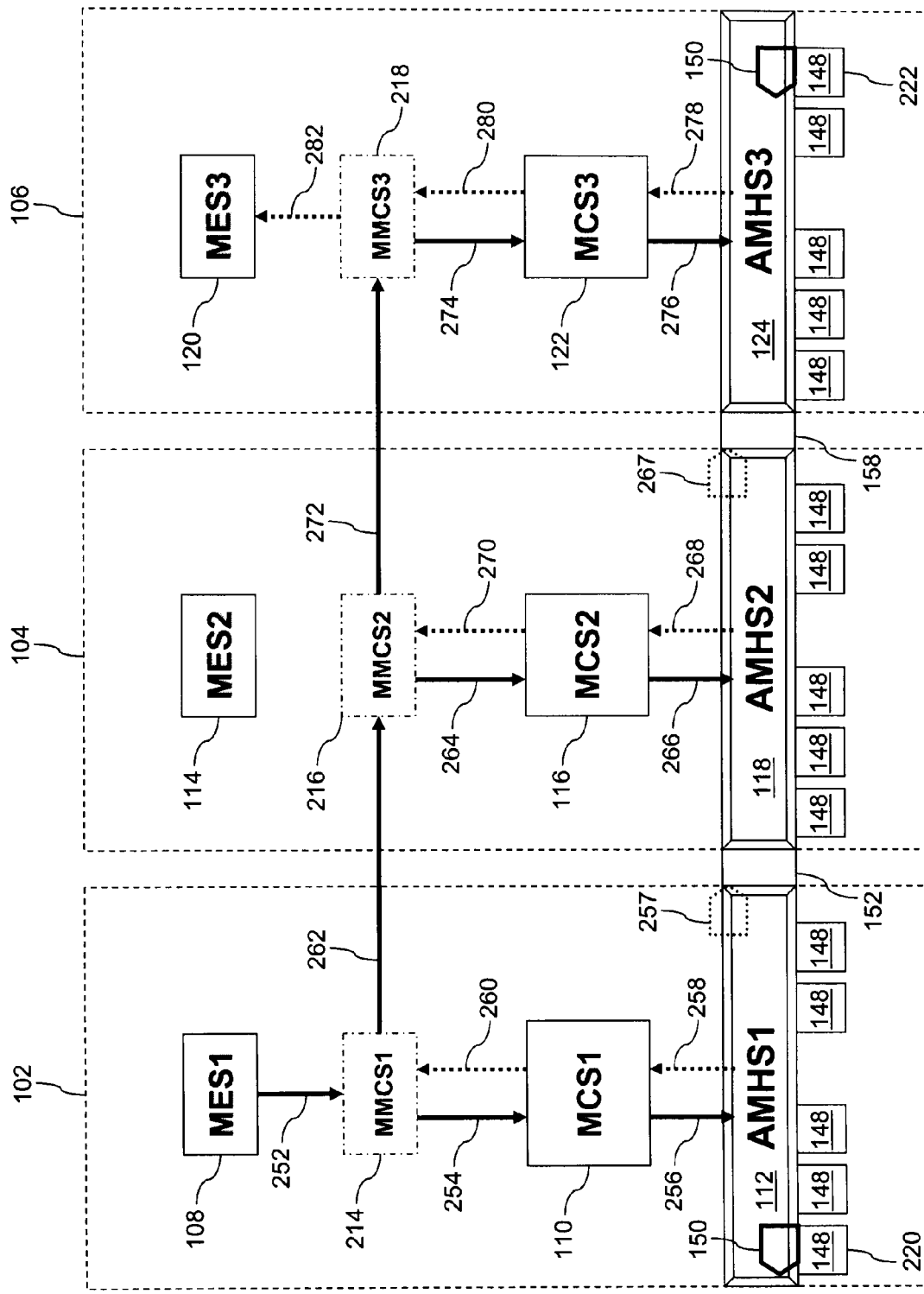
FIG. 7 is a schematic diagram illustrating a cross-fab transportation system and a cross-fab wafer transportation process according to one embodiment of the present disclosure.
Figure 8:
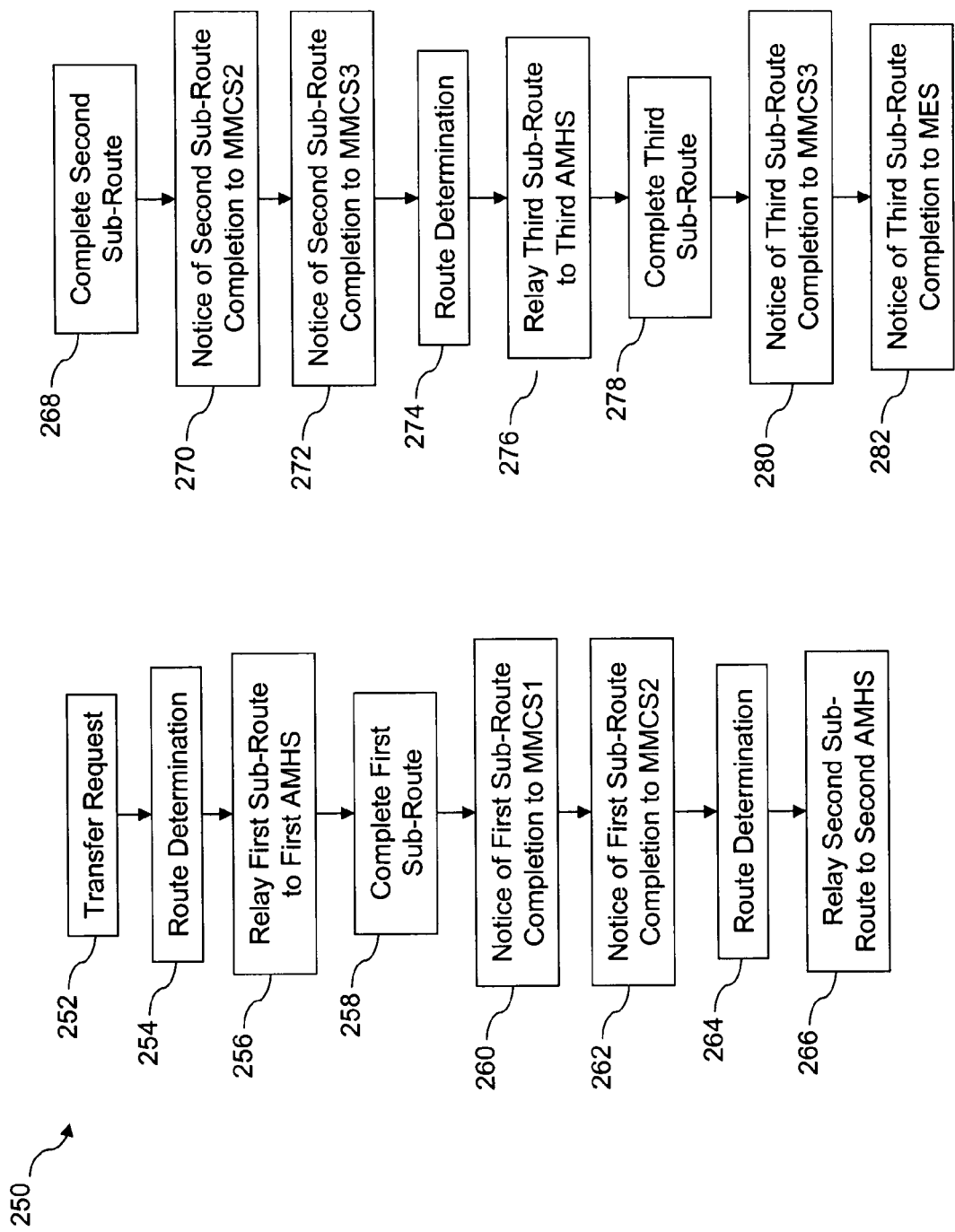
FIG. 8 is flowchart illustrating a method of transferring a wafer between fabs as illustrated in FIG. 7.

Referring now to FIGS. 7 and 8, a system and method for cross-AMHS and/or cross-fab transfer of a wafer lot will be described. FIG. 7 is a schematic diagram illustrating a cross-fab transportation system and a cross-fab wafer transportation process according to one embodiment of the present disclosure. FIG. 8 is flowchart illustrating a method of transferring a wafer between fabs according to one embodiment of the present disclosure and corresponding to the process illustrated in FIG. 7. As shown in FIG. 7, the fabs 102, 104, and 106 may be substantially similar to those shown in FIG. 4 described above. In that regard, fab 102 is shown with a master material control system 214 ("MMCS1"), fab 104 is shown with a master material control system 216 ("MMCS2"), and fab 106 is shown with a master material control system 218 ("MMCS3"). In that regard, the MMCS1 214, MMCS2 216, and MMCS3 218 may be parts of a unified control unit 126 and, in particular, a master material control system 128. Thus, communications between the MMCSs 214, 216, and 218 may be within a single MMCS. Similarly, communications between the MES, MMCS, MCS, and/or AMHS of a fab may include communications between an external system such as a unified control unit. However, it is fully contemplated that the MMCSs 214, 216, and 218 may be part of the fabs 102, 104, and 106, as shown.

Referring more specifically to FIG. 7, a FOUP 150 may be transferred from a position 220 within fab 102 to a position 222 within fab 106. One example, of a method 250 for transporting the FOUP 150 between the positions 220 and 222 will now be described with reference to FIGS. 7 and 8. The method 250 begins with step 252 where a transfer request is provided and communicated to MMCS1 214. The transfer request may be initiated from a unified control unit, an MES of a fab, or a manual request. In that regard, the request may be a general transfer request from one type of equipment to another. The unified control unit, the MES, and/or the user may select the actual equipment location where there is more than one available equipment location suitable for the transfer. In that regard, the selected location may be based on numerous factors including lot condition, lot priority, traffic conditions, available routes, length of the available routes, and/or other parameters. In the current embodiment, the transfer request has requested that the FOUP 150 be transported from position 220 within fab 102 to position 222 within fab 106.

The method 250 continues with step 254 in which the MMCS1 214 determines an appropriate route for transferring the FOUP between the current position 220 and the final position 222 and communicates that route to the MCS 110. In that regard, the MMCS1 214 may be part of a unified control unit that determines the overall route for the FOUP 150, such that the MMCS1 serves to provide a sub-route of the overall route for execution within fab 102. That is, in some embodiments the MMCS1 214 may serve to provide desired route instructions for the FOUP 150 within fab 102 only. In the current embodiment, the MMCS1 214 may provide the requisite route information for transferring the FOUP from position 220 to the bridge 152 between fab 102 and fab 104. Once the MMCS1 214 has determined an appropriate route for the FOUP 150 within fab 102, the step 254 continues with the corresponding route instructions being communicated from the MMCS1 214 to the MCS 110. As described above, the communication of the route instructions from the MMCS1 to the MCS 110 may include the use of an interpreter in some embodiments to convert a general communications protocol (e.g. CORBA) into a vendor specific protocol associated with the MCS 110.

After the route instructions have been communicated to the MCS 110, the method 250 continues with step 256 in which the MCS 110 relays the route instructions to the AMHS 112 for execution. After the AMHS 112 has transferred the FOUP 150 according to the route instructions, the method 250 continues with step 258 in which the AMHS signals to the MCS 110 that the transfer within fab 102 is complete. In the current embodiment, the AMHS 112 indicates that the FOUP 150 has been transferred to the bridge 152 as requested. The MCS 110 in turn relays notice of the completed transfer to the MMCS1 214 at step 260. The method 250 continues with step 262 where the MMCS1 214 transfers the notice of the completed transfer to the MMCS2 216. As described above, the MMCS1 214 and the MMCS2 216 may be parts of single MMCS. In such embodiments, the step 262 may be virtual and/or omitted because providing notice of the completed transfer to MMCS1 214 may also provide notice MMCS2 216.

Once the MMCS2 216 receives notice that the FOUP 150 has been transferred to bridge 152, the method 250 continues with step 264 in which the MMCS2 216 determines an appropriate route for transferring the FOUP between the current position at bridge 152 and the final position 222 and communicates that route to the MCS 116. In that regard, the MMCS2 216 may be part of a unified control unit that has determined the overall route for the FOUP 150, such that the MMCS2 serves to provide a sub-route of the overall route for execution within fab 104. In the current embodiment, the MMCS2 216 may provide the requisite route information for transferring the FOUP from the bridge 152 to the bridge 158 between fab 104 and fab 106. Once the MMCS2 216 has determined an appropriate route for the FOUP 150 within fab 104, the step 264 continues with the corresponding route instructions being communicated from the MMCS2 216 to the MCS 116. As described above, the communication of the route instructions from the MMCS2 216 to the MCS 116 may include the use of an interpreter.

After the route instructions have been communicated to the MCS 116, the method 250 continues with step 266 in which the MCS 116 relays the route instructions to the AMHS 118 for execution. After the AMHS 118 has transferred the FOUP 150 according to the route instructions, the method 250 continues with step 268 in which the AMHS signals to the MCS 116 that the transfer within fab 104 is complete. In the current embodiment, the AMHS 118 indicates that the FOUP 150 has been transferred to the bridge 158 as requested. The MCS 116 in turn relays notice of the completed transfer to the MMCS2 216 at step 270. The method 250 continues with step 272 where the MMCS2 216 transfers the notice of the completed transfer to the MMCS3 218. As described above, the MMCS2 216 and the MMCS3 218 may be parts of single MMCS. In such embodiments, the step 272 may be virtual and/or omitted because providing notice of the completed transfer to MMCS2 216 may also provide notice MMCS3 218.

Once the MMCS3 218 receives notice that the FOUP 150 has been transferred to bridge 158, the method 250 continues with step 274 in which the MMCS3 218 determines an appropriate route for transferring the FOUP between the current position at bridge 158 and the final position 222 and communicates that route to the MCS 122. In that regard, the MMCS3 218 may be part of a unified control unit that has determined the overall route for the FOUP 150, such that the MMCS3 serves to provide a sub-route of the overall route for execution within fab 106. In the current embodiment, the MMCS2 216 may provide the requisite route information for transferring the FOUP from the bridge 158 to the position 222. Once the MMCS3 218 has determined an appropriate route for the FOUP 150 within fab 106, the step 274 continues with the corresponding route instructions being communicated from the MMCS3 218 to the MCS 122. As described above, the communication of the route instructions from the MMCS3 218 to the MCS 122 may include the use of an interpreter.

After the route instructions have been communicated to the MCS 122, the method 250 continues with step 276 in which the MCS 122 relays the route instructions to the AMHS 124 for execution. After the AMHS 124 has transferred the FOUP 150 according to the route instructions, the method 250 continues with step 278 in which the AMHS signals to the MCS 122 that the transfer within fab 106 is complete. In the current embodiment, the AMHS 124 indicates that the FOUP 150 has been transferred to the position 222 as requested. The MCS 122 in turn relays notice of the completed transfer to the MMCS3 218 at step 280. In the current embodiment, the method 250 continues with step 282 where the MMCS3 218 transfers the notice of the completed transfer to the MES 120 of fab 106. In some embodiments, the MES 120 may be in communication with or part of a unified control unit and, in particular, in communication with or part of a central MES. In some such embodiments, the central MES may be in communication with an MMCS that includes MMCS3 218. In that regard, the step 282 may be virtual or omitted in some embodiments because providing notice of the completed transfer to MMCS3 218 may also provide notice to the central MES. In this manner, the FOUP 150 may be transferred between points 220 and 222 within different AMHSs and, in the current embodiment, within different fabs using an automated system.

Figure 9:
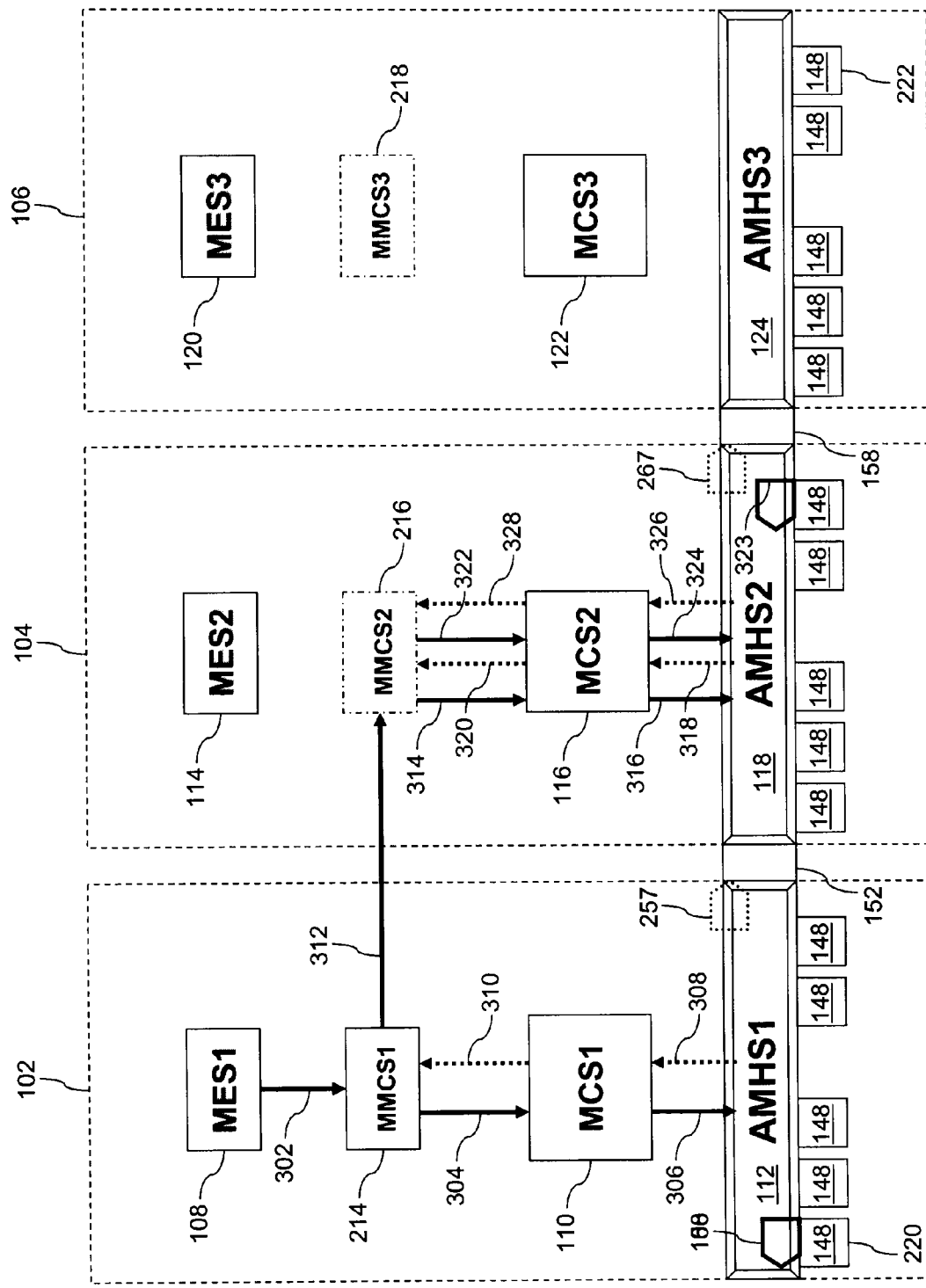
FIG. 9 is a schematic diagram illustrating a cross-fab transportation system and a cross-fab wafer transportation process according to another embodiment of the present disclosure.
Figure 10:
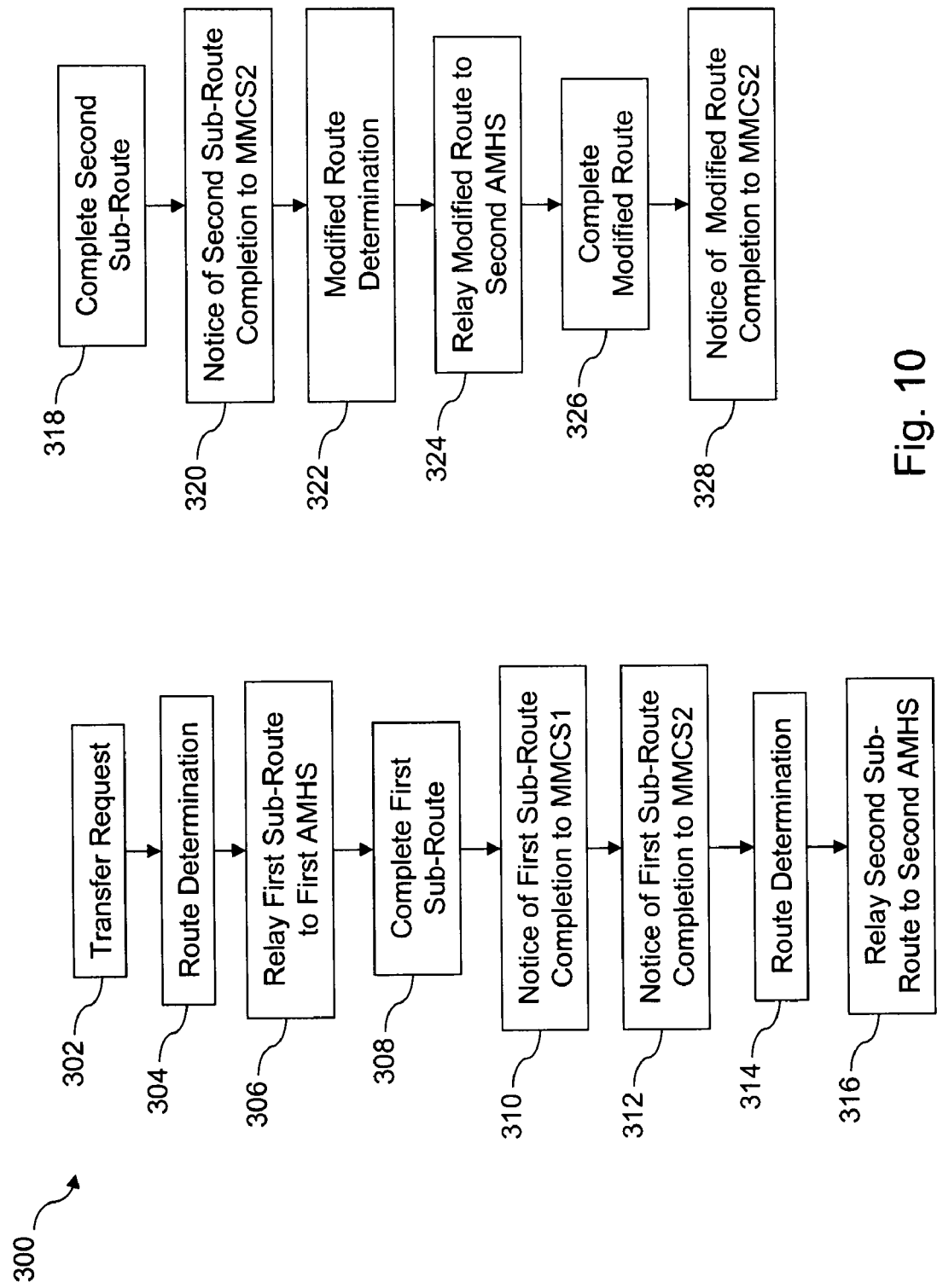
FIG. 10 is flowchart illustrating a method of transferring a wafer between fabs as shown in FIG. 9.

Referring now to FIGS. 9 and 10, a system and method for cross-AMHS and/or cross-fab transfer of a wafer lot will be described. In particular, FIGS. 9 and 10 illustrate a method of modifying a transfer request and/or rescheduling a transfer request after initiating the transfer. Modifying and/or rescheduling the transfer request may be a result of a system error, a manual request, changes in available route/traffic information, and/or combinations thereof. FIG. 9 is a schematic diagram illustrating a cross-fab transportation system and a cross-fab wafer transportation process according to one embodiment of the present disclosure. FIG. 10 is flowchart illustrating a method of transferring a wafer between fabs according to one embodiment of the present disclosure and corresponding to the process illustrated in FIG. 9. As shown in FIG. 9, the fabs 102, 104, and 106 may be substantially similar to those shown in FIG. 7 and described above.

Referring more specifically to FIG. 9, a transfer request may request that a FOUP 150 be transferred from a position 220 within fab 102 to a position 222 within fab 106. One example of a method 300 for modifying the transfer of the FOUP 150 between the positions 220 and 222 will now be described with reference to FIGS. 9 and 10. The method 300 begins with step 302 where a transfer request is provided and communicated to MMCS1 214. The transfer request may be initiated from a unified control unit, an MES of a fab, or a manual request. In that regard, the request may be a general transfer request from one type of equipment to another. The unified control unit, the MES, and/or the user may select the actual equipment location where there is more than one available equipment location suitable for the transfer. In that regard, the selected location may be based on numerous factors including lot condition, lot priority, traffic conditions, available routes, length of the available routes, and/or other parameters. In the current embodiment, the transfer request has requested that the FOUP 150 be transported from position 220 within fab 102 to position 222 within fab 106.

The method 300 continues with step 304 in which the MMCS1 214 determines an appropriate route for transferring the FOUP between the current position 220 and the final position 222 and communicates that route to the MCS 110. In that regard, the MMCS1 214 may be part of a unified control unit that determines the overall route for the FOUP 150, such that the MMCS1 serves to provide a sub-route of the overall route for execution within fab 102. That is, in some embodiments the MMCS1 214 may serve to provide desired route instructions for the FOUP 150 within fab 102 only. In the current embodiment, the MMCS1 214 may provide the requisite route information for transferring the FOUP from position 220 to the bridge 152 between fab 102 and fab 104. Once the MMCS1 214 has determined an appropriate route for the FOUP 150 within fab 102, the step 254 continues with the corresponding route instructions being communicated from the MMCS1 214 to the MCS 110. As described above, the communication of the route instructions from the MMCS1 to the MCS 110 may include the use of an interpreter in some embodiments to convert a general communications protocol (e.g. CORBA) into a vendor specific protocol associated with the MCS 110.

After the route instructions have been communicated to the MCS 110, the method 300 continues with step 306 in which the MCS 110 relays the route instructions to the AMHS 112 for execution. After the AMHS 112 has transferred the FOUP 150 according to the route instructions, the method 300 continues with step 308 in which the AMHS signals to the MCS 110 that the transfer within fab 102 is complete. In the current embodiment, the AMHS 112 indicates that the FOUP 150 has been transferred to the bridge 152 as requested. The MCS 110 in turn relays notice of the completed transfer to the MMCS1 214 at step 310. The method 300 continues with step 312 where the MMCS1 214 transfers the notice of the completed transfer to the MMCS2 216. As described above, the MMCS1 214 and the MMCS2 216 may be parts of single MMCS. In such embodiments, the step 262 may be virtual and/or omitted because providing notice of the completed transfer to MMCS1 214 may also provide notice MMCS2 216.

Once the MMCS2 216 receives notice that the FOUP 150 has been transferred to bridge 152, the method 300 continues with step 314 in which the MMCS2 216 determines an appropriate route for transferring the FOUP between the current position at bridge 152 and the final position 222 and communicates that route to the MCS 116. In that regard, the MMCS2 216 may be part of a unified control unit that has determined the overall route for the FOUP 150, such that the MMCS2 serves to provide a sub-route of the overall route for execution within fab 104. In the current embodiment, the MMCS2 216 may provide the requisite route information for transferring the FOUP from the bridge 152 to the bridge 158 between fab 104 and fab 106. Once the MMCS2 216 has determined an appropriate route for the FOUP 150 within fab 104, the step 314 continues with the corresponding route instructions being communicated from the MMCS2 216 to the MCS 116. As described above, the communication of the route instructions from the MMCS2 216 to the MCS 116 may include the use of an interpreter.

After the route instructions have been communicated to the MCS 116, the method 300 continues with step 316 in which the MCS 116 relays the route instructions to the AMHS 118 for execution. After the AMHS 118 has transferred the FOUP 150 according to the route instructions, the method 300 continues with step 318 in which the AMHS signals to the MCS 116 that the transfer within fab 104 is complete. In the current embodiment, the AMHS 118 indicates that the FOUP 150 has been transferred to the bridge 158 as requested. The MCS 116 in turn relays notice of the completed transfer to the MMCS2 216 at step 320.

The method 300 continues with step 322 where the MMCS2 216 provide modified route information for transferring the FOUP 150. In that regard, the modified route info may be in response to an error in the transfer execution, manual entry, traffic conditions, equipment availability, and/or other conditions. In the current embodiment, the MMCS2 216 indicates that the FOUP 150 should be transferred from bridge 158 to a position 323 within fab 104. Position 323 may be a holding position within a stocker or other equipment and/or the position 323 may be another type of equipment. Again, the MMCS2 216 may provide the requisite route information for transferring the FOUP from the bridge 158 to the position 323. Once the MMCS2 216 has determined an appropriate route for the FOUP 150 within fab 104, the step 322 continues with the corresponding modified route instructions being communicated from the MMCS2 216 to the MCS 116. After the modified route instructions have been communicated to the MCS 116, the method 300 continues with step 324 in which the MCS 116 relays the route instructions to the AMHS 118 for execution. After the AMHS 118 has transferred the FOUP 150 according to the route instructions, the method 300 continues with step 326 in which the AMHS signals to the MCS 116 that the transfer within fab 104 is complete. In the current embodiment, the AMHS 118 indicates that the FOUP 150 has been transferred to the position 323 as requested. The MCS 116 in turn relays notice of the completed transfer to the MMCS2 216 at step 328. In some embodiments, the FOUP 150 may be later transferred from position 323 to position 222 according to another transfer request.

Figure 11:
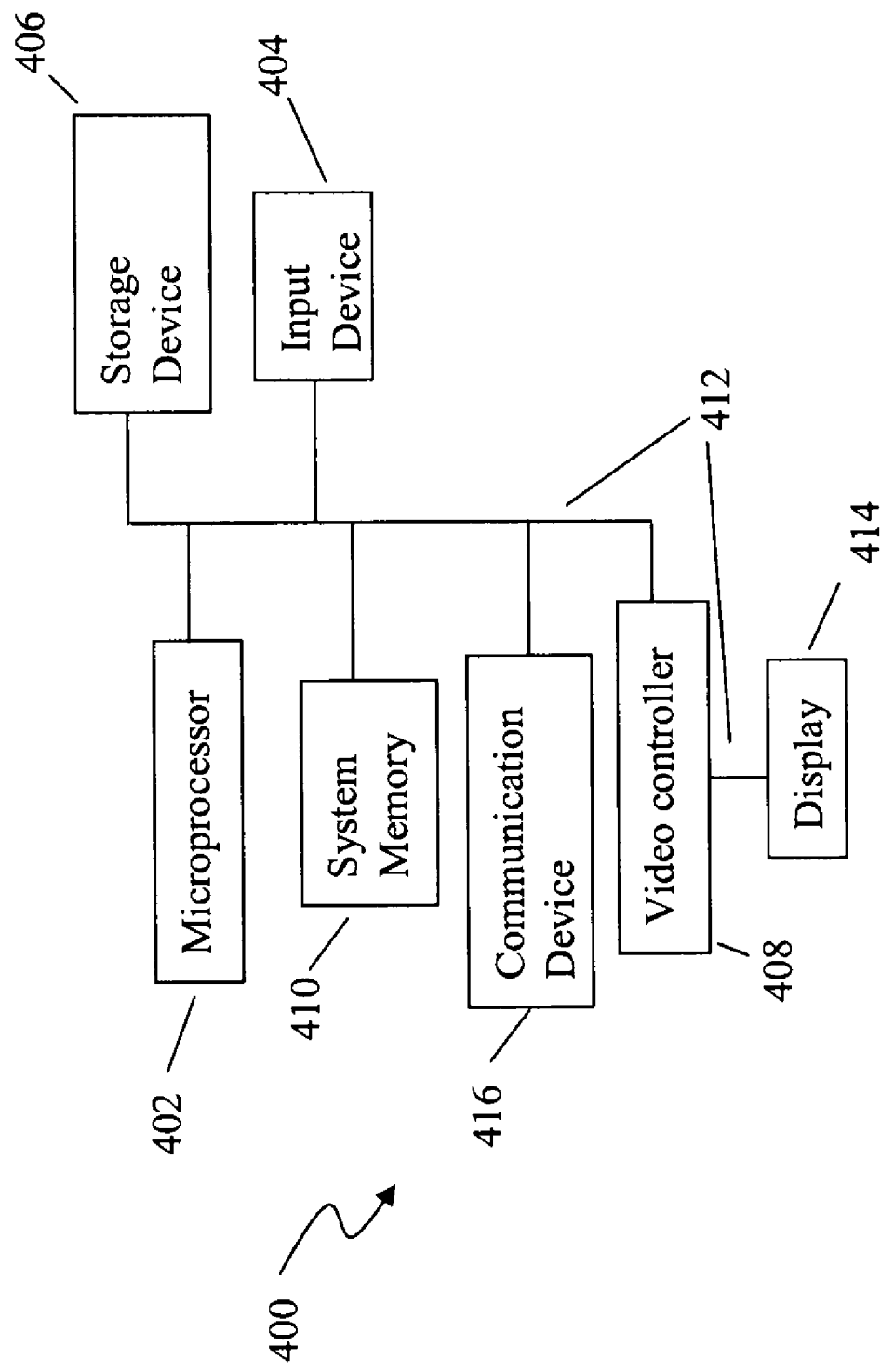
FIG. 11 is a flowchart illustrating a method of transporting a wafer between a plurality of fabs according to one embodiment of the present disclosure.

Referring now to FIG. 11, shown therein is an illustrative node 400 for implementing embodiments of the methods described above. Node 400 includes a microprocessor 402, an input device 404, a storage device 406, a video controller 408, a system memory 410, and a display 414, and a communication device 416 all interconnected by one or more buses 412. The storage device 406 could be a floppy drive, hard drive, CD-ROM, optical drive, or any other form of storage device. In addition, the storage device 406 may be capable of receiving a floppy disk, CD-ROM, DVD-ROM, or any other form of computer-readable medium that may contain computer-executable instructions. Further communication device 416 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the present disclosure. One example is to directly manufacture software functions into a silicon chip. Accordingly, it should be understood that combinations of hardware and software are also included within the definition of a computer system and are thus envisioned by the present disclosure as possible equivalent structures and equivalent methods.

Computer-readable mediums include passive data storage, such as a random access memory (RAM) as well as semi-permanent data storage such as a compact disk read only memory (CD-ROM). In addition, an embodiment of the present disclosure may be embodied in the RAM of a computer to transform a standard computer into a new specific computing machine.

Data structures are defined organizations of data that may enable an embodiment of the present disclosure. For example, a data structure may provide an organization of data, or an organization of executable code. Data signals could be carried across transmission mediums and store and transport various data structures, and, thus, may be used to transport an embodiment of the present disclosure.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. It is understood that various different combinations of the above-listed processing steps can be used in combination or in parallel. Also, features illustrated and discussed above with respect to some embodiments can be combined with features illustrated and discussed above with respect to other embodiments. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A factory automation system for wafer transportation across separate automatic material handling systems ("AMHSs") of a semiconductor foundry, the factory automation system comprising:
    a master material control system in communication with a first material control system ("MCS") that is in communication with a first AMHS from a first vendor in accordance with a first communication protocol of the first vendor and a second AMHS from a second vendor in accordance with a second communication protocol of the second vendor, wherein the first vendor and the second vendor are different, and wherein the first communication protocol and the second communication protocol are different; and
    a first bridge connecting the first AMHS and the second AMHS, the first bridge configured to allow wafer transfers between the first AMHS and the second AMHS;
    wherein the master material control system is configured to communicate with the first MCS and asecond MCS to control wafer transportation across the first and second AMHSs and the bridge.

2. The factory automation system of claim 1, wherein the first bridge includes at least one stocker.

3. The factory automation system of claim 1, wherein the bridge is part of an overhead track system.

4. The factory automation system of claim 1, wherein the bridge is part of an overhead shuttle system.

5. The factory automation system of claim 1, wherein the first AMHS is part of a first fab and the second AMHS is part of a second fab.

6. The factory automation system of claim 1, wherein the first AMHS and the second AMHS are part of a first fab.

7. The factory automation system of claim 1, wherein the master material control system includes a transaction dispatcher for sending routing signals to the first MCS and the second MCS to control wafer transportation across the first and second AMHSs and the bridge.

8. The factory automation system of claim 7, further comprising:
    a first interpreter for translating the routing signals sent from the transaction dispatcher to the first MCS into a first communication protocol for use by the first AMHS; and
    a second interpreter for translating the routing signals sent from the transaction dispatcher to the second MCS into a second communication protocol for use by the second AMHS.

9. The factory automation system of claim 1, further comprising a central manufacturing execution system ("MES") in communication with the master material control system, the central MES for controlling the master material control system.

10. The factory automation system of claim 9, wherein the central MES is in communication with a first MES associated with the first MCS, and wherein the central MES is in communication with a second MES associated with the second MCS.

* * * * *